United States Patent [19]

Miller

[11] Patent Number: 4,913,042
[45] Date of Patent: Apr. 3, 1990

[54] DEEP FAT FRYER

[75] Inventor: Michael E. Miller, Bellevue, Ohio

[73] Assignee: Stein, Inc., Sandusky, Ohio

[21] Appl. No.: 396,942

[22] Filed: Aug. 21, 1989

[51] Int. Cl.$^4$ .............................................. A47J 37/12
[52] U.S. Cl. ...................................... 99/404; 99/336; 99/408
[58] Field of Search .......................... 99/403, 404–406, 99/330, 331, 336, 337, 408, 443 C

[56] References Cited

U.S. PATENT DOCUMENTS

| 1,234,131 | 7/1917 | Cleveland . | |
|---|---|---|---|
| 3,282,197 | 11/1966 | Smith, Jr. | 99/330 |
| 3,376,806 | 4/1968 | Magnusson | 99/404 X |
| 3,585,923 | 6/1971 | Waller | 99/404 X |
| 3,733,202 | 5/1973 | Marmor . | |
| 3,757,672 | 9/1973 | Szabrak et al. | 99/404 |
| 3,824,917 | 9/1974 | Kawahara et al. | 99/404 |
| 4,189,994 | 2/1980 | Schmader | 99/405 |
| 4,366,749 | 1/1983 | Caridis et al. | 99/404 |
| 4,478,140 | 10/1984 | Bullock | 99/404 |
| 4,491,602 | 1/1985 | Miller | 99/404 |
| 4,706,556 | 11/1987 | Wallace et al. | 99/330 |
| 4,706,557 | 11/1987 | Feng et al. | 99/405 |
| 4,744,293 | 5/1988 | Shimokawa | 99/404 |

FOREIGN PATENT DOCUMENTS 277534  10/1970  U.S.S.R. .............................. 99/406

Primary Examiner—Timothy F. Simone
Attorney, Agent, or Firm—Baldwin, Egan & Fetzer

[57] ABSTRACT

An oil circulation system for use in a deep fat fryer which has a heated bath of cooking oil carried in a reservoir through which food products are carried on a conveyor means for cooking or frying said products; the oil circulation system generating a flow of cooking oil that moves through the oil bath in a direction transverse to the movement of the food product and which provides substantially equal temperature throughout the oil bath.

15 Claims, 2 Drawing Sheets

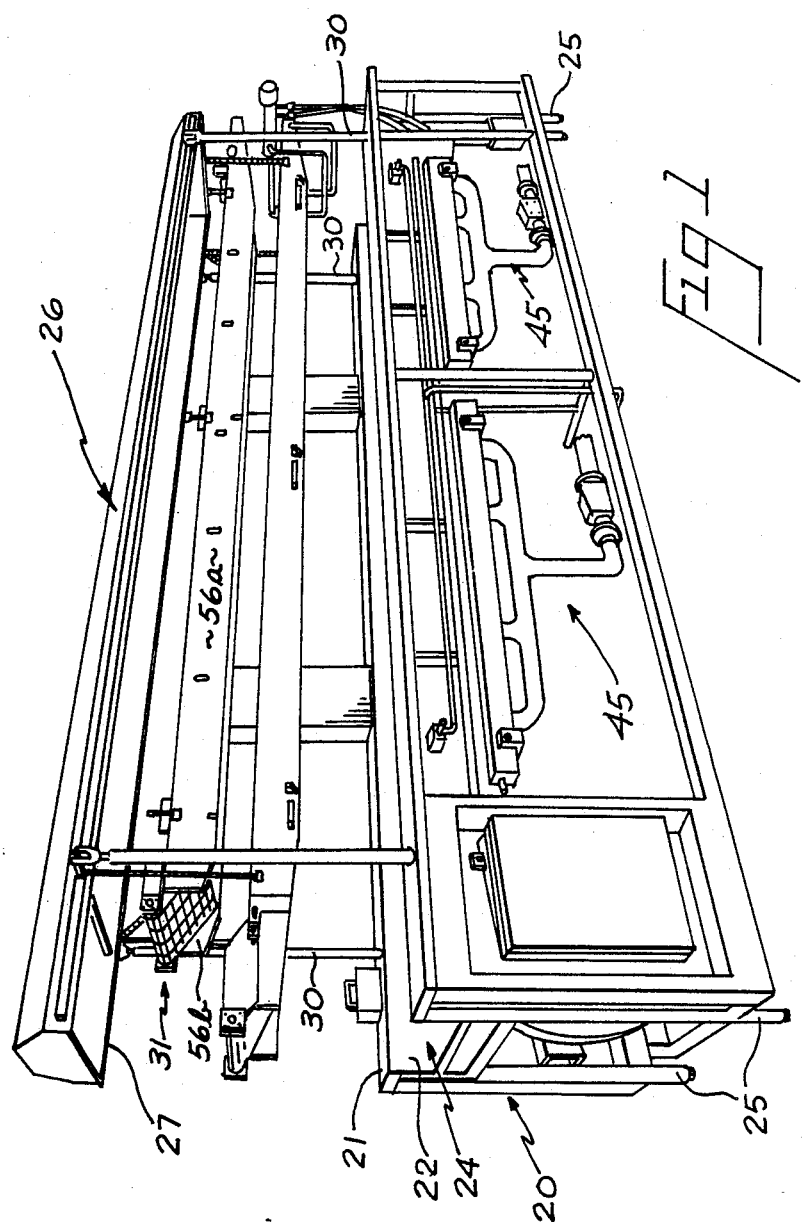

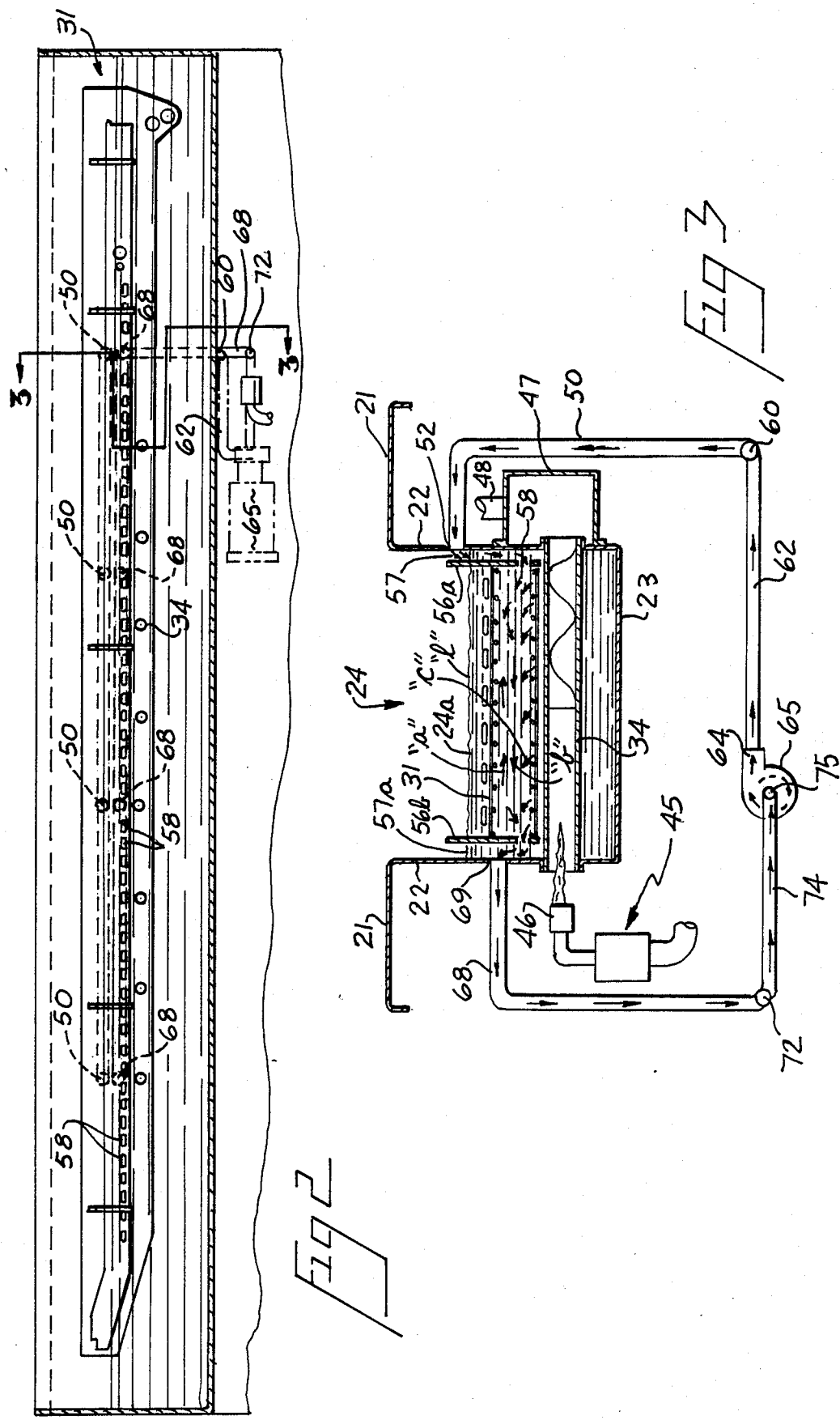

DEEP FAT FRYER

This invention relates to deep fat fryers for use in continuous deep fat frying large quantities of food products, and more particularly to a novel and new oil circulation system especially designed for use with a deep fat fryer.

In conventional direct gas-fired deep fat fryers, such as the type disclosed in the assignee's U.S. Pat. No. 3,757,672 the frying oil is contained in an elongated reservoir and is heated by a series of heater tubes that extend transversely across the reservoir and below the surface of the oil therein. Heat provided by a suitable gas flame or the like is introduced into one end of each of the tubes i.e. the burner end whereby the surrounding oil in proximity thereto is heated to the desired temperature. As a result, the cooking oil becomes hotter adjacent the flame end of the burner tube and becomes progressively relatively cooler toward the opposite or flue end of the burner tube. Food products supported on an endless conveyor are submerged into the heated frying oil and are cooked thereby as the same are conveyed longitudinally through the reservoir.

This present day fryer structure causes several major problems. The cooling or frying oil at the hotter or burner end of the heating tubes adjacent one side of the reservoir expands and flows transversely across said reservoir toward the opposite or relatively cooler side. This transverse hot oil flow causes the relatively cooler oil to flow reversibly across the reservoir back toward the burner end of the burner tube and under the hotter oil flow whereat it is re-heated to the relatively higher temperature. This resultant oppositely flowing transverse hot oil flow tends to generate turbulence and to carry lightweight food product to the cooler side of the conveyor.

The food product adjacent the hot side of the fryer (burner end) also tends to be darker in color than the food product adjacent the cooler side or at the flue end of the burner tubes.

SUMMARY OF THE INVENTION

The present invention is directed to an oil circulation system or apparatus that is effective to overcome the above-noted deficiencies in the present day fryer, and provides substantially equal temperature for the heated oil transversely across the oil reservoir throughout the length of said reservoir.

BRIEF DESCRIPTION OF THE DRAWINGS

FIG. 1 is an isometric side view of a conventional deep fat fryer to which the oil circulation apparatus of the present invention is especially adapted;

FIG. 2 is a fragmentary side view shown partially in section of the fryer of FIG. 1 and showing the oil circulation system or apparatus of the present invention incorporated therein; and FIG. 3 is a sectional view taken generally on line 3—3 of FIG. 2 and somewhat enlarged to illustrate the oil circulation system or apparatus of the present invention.

DESCRIPTION OF DISCLOSED EMBODIMENT

A conventional deep fat fryer apparatus of the type disclosed and claimed in U.S. Pat. No. 3,757,672 is illustrated in FIG. 1, and generally comprises a rigid unitary frame 20 which extends from end to end of the apparatus and provided with apron members 21 which are directly secured to the top of the frame 20. The side wall members 22 vertically disposed on each side of frame 20 and extending end to end of frame 20 are each attached as best seen in FIG. 3 to a bottom 23 to form an open top reservoir 24 for holding a bath of hot oil as depicted at 24a. The frame has feet 25 which rest upon the floor.

Mounted above the frame 20 is an elongated hood or cover 26 which has a planar rectangular opening 27 at its lower side which makes a close fit with the aprons 21 when the apparatus is in its nested and closed position for operation.

As is more fully disclosed in said U.S. Pat. No. 3,757,672 which disclosure is incorporated herein by reference, the hood 26 is raised and lowered to its open and closed positions by suitable hydraulically operable jack units, as partially depicted at 30 in FIG. 1.

A conveyor assembly as indicated generally at 31, and which is also more fully disclosed in said aforementioned U.S. Pat. No. 3,757,672, is supported within the hood assembly 26 and is positioned within the oil bath 24a as illustrated in FIG. 3, when the hood 26 is lowered to its closed position with respect to frame 20. When the hood 26 is raised to its open position as seen in FIG. 1, the conveyor assembly 31 is likewise raised out of the oil bath 24a and thus available for cleaning, repair and the like.

With the conveyor assembly 31 disposed in the heated oil bath 24a, food product "p" carried thereon is conveyed through said oil bath and is cooked or fried therein.

As best seen in FIGS. 1 and 3, a conventionally gas fired heating source 45 includes a plurality of heater tubes 34 disposed in the reservoir in preselected spaced relation being immersed within the oil bath and extending transversely thereacross, being likewise spaced above the bottom 23 of said reservoir. The ends of each tube 34 project through the side walls 22 of the reservoir in fluid sealed relation.

As best seen in FIG. 3, a burner unit 46 is disposed closely adjacent the burner end of each burner tube 34. With this assembly, when the burner unit 46 is ignited the heat produced by the emitting flame "f" within its associated burner tube 34 enters the burner end thereof and heats the oil bath surrounding said tube.

Flue gas flow through each burner tube 34 and exits therefrom and into a flue box or manifold 47 connected to the flue end of each said tubes 34 and therein out through exhaust pipe 48 for dispersal.

As aforementioned, it has been experienced that upon being heated, the cooking or frying oil at the hotter or burner end of the heating tubes expands and flows transversely across the oil reservoir as depicted by the arrows "a" toward the opposite or relatively cooler side. This transverse hot oil flow causes the relatively cooler oil adjacent the cooler side of the reservoir to flow reversibly across the reservoir back toward the burner end of the burner tube in the direction of the arrows "b" whereat it is re-heated to the relatively higher temperature. The transverse oil flows a and b tend to lift lightweight food product off the conveyor resulting in difficulty in maintaining the food product properly on the conveying apparatus. Likewise, the oil is generally at a higher temperature adjacent the burner end of the tubes 34.

To counteract the above operational and structural deficiencies, the fryer of the present invention is provided with an oil circulation apparatus or system that generates an oil flow hereinafter called counter balancing oil flow, that moves transversely across the reservoir 22 in volume and velocity from the cooler side of the reservoir i.e. the right side wall as viewed in FIG. 3 and toward the hotter side of the reservoir i.e. the left side all, as also viewed in FIG. 3.

This transverse counter balancing oil flow is affective to nullify the affects of the oppositely travelling convection oil flows "a" and "b" as hereinabove referred to.

As best seen in FIGS. 2 and 3, the oil circution apparatus or system comprises a plurality of inlet pipes 50, the number being selective and in the present embodiment of fryer being four, which are disposed in equal spaced longitudinal relationship to each other, along the side of the reservoir and having one end of each said pipes connected at 52 to the side wall 22 of the reservoir to which the exhaust manifold 47 is mounted. This is also the side of the reservoir referred to herein as the cooler side. As seen in FIG. 3, the connected end 52 of each pipe 50 communicates with the interior or the reservoir above the normal level "1" of the oil therein, and closely adjacent the upstanding supporting rail member 56a for the main conveyor 31. As seen in FIG. 3, the rail member 56a is disposed in close proximity to the adjacent side wall of reservoir 24 to define a small spacing 57 therebetween. As is also seen in FIG. 3, the rail member 56a adjacent the bottom edge thereof is provided with a plurality of holes 58 spaced longitudinally along said rail member, the purpose for which will be later explained.

The opposite end of each inlet pipe 50 is connected to a coupling conduit 60, said conduit, in turn, being connected to one end of pipe 62. The opposite end of pipe 62 is connected to the outlet port 64 of a conventional oil variable speed and flow pump 65.

A plurality of outlet pipes 68 is similarly disposed along the opposite side wall or hot side of the reservoir being preferably directly opposite the pipe members 50 being likewise our in number in the instant fryer embodiment; each of said pipes 69 having its one end 69 connected to said opposite side wall of the reservoir. As best seen in FIG. 3, the connected end 69 of each outlet pipe 68 communicates with the interior of the reservoir below the level "1" of the oil therein and adjacent the opposite rail member 56b of the main conveyor 31.

The rail member 56b is likewise spaced closely adjacent the side wall of the reservoir to define a narrow spacing 57a therebetween. Rail member 56b is also provided with a series of holes 70 adjacent its bottom edge.

The opposite end of each outlet pipe 68 is connected to a coupling conduit 72, said conduit, in turn, connecting with one end of inlet pipe 74, the opposite end of which, connects to the inlet port 75 of the pump 65.

With this assembly, and with the pump 65 connected to a suitable power source and thereby energized, oil is pumped out of the reservoir below oil level "1" through outlet pipes 68, coupling conduit 72 and pipe 74, then through pump 65, reservoir inlet pipe 62, coupling conduit 60 and inlet pipes 50 back into the opposite side of reservoir 22. As noted in FIG. 3, the oil flow through inlet pipes 50 enters the reservoir above the level "1" of the oil and strikes against the upstanding rail member 56a and thence falls into the spacing 57. Oil is drawn from spacing 57 through holes 58 to establish the "counter balancing" oil flow as is depicted at "c" in FIG. 3.

As also seen in FIG. 3, the outlet pipes 68 communicate with the spacing 57a and draw oil therefrom. Oil defining the "counter balancing" flow is drawn through the holes 70 in the adjacent rail member 56b and out of the reservoir through said pipes 68. By passing the "counter balancing" flow from spacing 57a and 57b and through the spaced holes 58 and 70 in the rail members 56a and 56b, substantially little or no turbulence is created in the oil in the reservoir by said "counter balancing" flow. By taking the relatively hotter oil from the hot side of the reservoir and re-inserting it into the oil bath at the relatively cooler side, the resulting "counter balancing" oil flow "c" reacts with the transverse oil flows "a" and "b" and is effective to eliminate the oil temperature differential between the hot side and cool side of the reservoir, and also nullifies substantially the tendency of the transverse oil flows "a" and "b" to lift food product off the conveying means.

The volume and velocity of the "counter balancing" oil flow may be adjustable by the variable speed and flow pump 65 so that the temperature of the oil in the reservoir is the same measured across the width of the reservoir. In this manner, the temperature variance in the oil caused by the transverse oil flows "a" and "b" as above referred to are substantially nullified. Also, the volume and velocity of the "counter balancing" oil flow is adjustable to substantially nullify the effect of said transverse oil flows "a" and "b".

Having thus described a preferred embodiment of oil circulation system for "counter balancing" transverse oil flow in the frying oil of a deep fat fryer resulting from temperature differentials in said oil, it will be realized that modifications of the oil circulation system may be made without departing from the inventive concepts of the present invention as defined in the claims.

I claim:

1. In a deep fat fryer having frying oil in a reservoir and means for heating said oil to a frying temperature, and conveying means for supporting and moving food products longitudinally through the reservoir and oil to cause cooking or frying of the product; an oil circulation system for nullifying any temperature differential and resultant transverse oil flow in the oil extending transversely across the reservoir between a hot oil side of the reservoir and a relatively cooler oil side thereof and caused by said heating means comprising conduit means connectable between the hot side and relatively cooler side of the reservoir and means for generating a counter balancing oil flow through said conduit means and through said reservoir from said relatively cooler side to said hot side of said reservoir.

2. An oil circulation system in a deep fat fryer as is defined in claim 1 and wherein the conduit means comprises a plurality of individual pipe members connectable between the hot side and the relatively cooler side of the reservoir.

3. An oil circulation system in a deep fat fryer as is defined in claim 2 and wherein the individual pipe members are connectable between the hot side and the relatively cooler side of the reservoir and in longitudinally spaced relation therealong.

4. An oil circulation system in a deep fat fryer as is defined in claim 1 and wherein pump means are connectable to the conduit means and operable to provide an oil flow therethrough into the relatively cooler side of the reservoir and out of the hot side effective to generate a counter balancing oil flow in the reservoir from said relatively cooler side and toward the hot side thereof.

5. In a deep fat fryer having fryer oil in a reservoir and means for heating said oil to a frying temperature, and conveying means for supporting and moving food product longitudinally through the reservoir and oil to cause cooking or frying of the product; an oil circulation system for nullifying any temperature differential and resultant transverse oil flow created in the oil and extending transversely across the reservoir between a hot oil side of the reservoir and a relatively cooler oil side thereof and which is caused by said heating means comprising a plurality of first pipe members each communicating at one end with the hot oil side of the reservoir and at the opposite end thereof with the inlet of fluid pump means, a plurality of second pipe members each communicating at one end with the cooler side of the reservoir and at the opposite end thereof with the outlet of said pump means, and said pump means being operable to extract hot oil from the hot side of said reservoir through said first pipe members and pump means thence through said second pipe member, and into said reservoir at the cooler side thereof affective to generate a counter balancing oil flow in the reservoir to nullify the transverse oil flow.

6. An oil circulating system for use in a deep fat fryer as is defined in claim 5 and wherein the first pipe members each communicate at their said one end in longitudinal spaced relation along the hot side of the reservoir.

7. An oil circulation system for use in a deep fat fryer as is defined in claim 5 and wherein the second pipe members each communicate at their said one end in longitudinal spaced relation along the cooler side of the reservoir.

8. An oil circulation system for use in a deep fat fryer as is defined in claim 5 and wherein the first pipe members each communicate at their said one end in longitudinal spaced relation along the hot side of the reservoir and the second pipe members each communicate at their said one end in longitudinal spaced relation along the cooler side of the reservoir.

9. An oil circulation system for use in a deep fat fryer as is defined in claim 5 and wherein first conduit means connect the opposite end of each of the first pipe members to the inlet of the pump means.

10. An oil circulation system for use in a deep fat fryer as is defined in claim 5 and wherein second conduit means connect the opposite end of each of the second pipe members to the outlet of the pump means.

11. An oil circulation system for use in a deep fat fryer as is defined in claim 5 and wherein first conduit means connect the opposite end of each of the first pipe members to the inlet of the pump means and second conduit means connect the opposite end of each of the second pipe members to the outlet of the pump means.

12. An oil circulation system for use in a deep fat fryer as is defined in claim 5 and wherein means in the reservoir are operable to prevent turbulence between the counter balancing oil flow and the transverse oil flow.

13. An oil circulation system for use in a deep fat fryer as is defined in claim 5 and wherein the one end of each of the first pipe members communicates with the hot side of the reservoir below the normal level of the oil therein.

14. An oil circulation system for use in a deep fat fryer as is defined in claim 5 and wherein the one end of each of the second pipe members communicates with the cooler side of the reservoir above the normal level of the oil therein.

15. An oil circulation system for use in a deep fat fryer as is defined in claim 5 and wherein the one end of each of the first pipe members communicates with the hot side of the reservoir below the normal level of the oil therein and the one end of each of the second pipe members communicates with the cooler side of the reservoir above the normal level of the oil therein.

* * * * *